United States Patent
Kim et al.

(10) Patent No.: US 10,305,534 B2
(45) Date of Patent: May 28, 2019

(54) METHOD FOR ALLOWING USER EQUIPMENT (UE) TO PERFORM UE-FLEXIBLE TIME DIVISION DUPLEX (TDD) MODE COMMUNICATION IN NETWORK CONFIGURED TO SUPPORT UE-FLEXIBLE TDD MODE IN WHICH BASE STATION (BS) OPERATES IN FULL DUPLEX MODE AND UE OPERATES IN HALF DUPLEX MODE, AND THE USER EQUIPMENT (UE) FOR THE SAME

(71) Applicant: LG ELECTRONICS INC., Seoul (KR)

(72) Inventors: Jinmin Kim, Seoul (KR); Jaehoon Chung, Seoul (KR); Genebeck Hahn, Seoul (KR); Eunjong Lee, Seoul (KR); Kukheon Choi, Seoul (KR); Kwangseok Noh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 179 days.

(21) Appl. No.: 15/325,431

(22) PCT Filed: Dec. 24, 2014

(86) PCT No.: PCT/KR2014/012810
§ 371 (c)(1),
(2) Date: Jan. 10, 2017

(87) PCT Pub. No.: WO2016/006779
PCT Pub. Date: Jan. 14, 2016

(65) Prior Publication Data
US 2017/0187416 A1    Jun. 29, 2017

Related U.S. Application Data

(60) Provisional application No. 62/022,665, filed on Jul. 10, 2014.

(51) Int. Cl.
*H04B 1/58*    (2006.01)
*H04L 5/00*    (2006.01)
(Continued)

(52) U.S. Cl.
CPC ............... *H04B 1/58* (2013.01); *H04L 5/001* (2013.01); *H04L 5/0023* (2013.01); (Continued)

(58) Field of Classification Search
CPC ........... H04B 1/58; H04L 25/20; H04L 5/001; H04L 5/0023; H04L 5/0028; H04L 5/0032; H04L 5/0092; H04L 5/1469; H04L 5/16; H04W 72/044; H04W 72/0446
See application file for complete search history.

(56) References Cited

U.S. PATENT DOCUMENTS

2007/0248057 A1* 10/2007 Keidar .................. H04W 74/04
370/337
2009/0092066 A1* 4/2009 Chindapol ............ H04W 76/45
370/277
(Continued)

FOREIGN PATENT DOCUMENTS

KR    1020130115348    10/2013

OTHER PUBLICATIONS

PCT International Application No. PCT/KR2014/012810, Notification of Transmittal of the International Search Report and the Written Opinion of the International Searching Authority, or Declaration dated Mar. 25, 2015, 10 pages.

(Continued)

*Primary Examiner* — Kashif Siddiqui
(74) *Attorney, Agent, or Firm* — Lee, Hong, Degerman, Kang & Waimey

(57) ABSTRACT

A method for performing communication by a user equipment (UE) in a UE-flexible Time Division Duplex (TDD) mode in a network configured to support the UE-flexible TDD mode in which a base station (BS) operates in a full duplex mode and the UE operates in a half duplex mode includes receiving information associated with a UE-flexible TDD mode support cell configured to support the UE-flexible TDD mode through a primary cell (PCell) from the base station (BS); and receiving a physical downlink shared channel (PDSCH) from the base station (BS) through the UE-flexible TDD mode support cell based on the information.

10 Claims, 15 Drawing Sheets

(51) Int. Cl.
*H04L 5/14* (2006.01)
*H04L 5/16* (2006.01)
*H04L 25/20* (2006.01)
*H04W 72/04* (2009.01)

(52) U.S. Cl.
CPC .......... *H04L 5/0028* (2013.01); *H04L 5/0032* (2013.01); *H04L 5/0092* (2013.01); *H04L 5/1469* (2013.01); *H04L 5/16* (2013.01); *H04L 25/20* (2013.01); *H04W 72/044* (2013.01); *H04W 72/0446* (2013.01)

(56) References Cited

U.S. PATENT DOCUMENTS

| | | | |
|---|---|---|---|
| 2009/0135748 A1* | 5/2009 | Lindoff | H04W 72/048 370/296 |
| 2013/0051288 A1 | 2/2013 | Yamada et al. | |
| 2013/0083704 A1 | 4/2013 | Gaal et al. | |
| 2014/0029484 A1* | 1/2014 | Choi | H04J 3/1694 370/280 |
| 2014/0153453 A1 | 6/2014 | Park et al. | |
| 2015/0237626 A1* | 8/2015 | Li | H04W 72/0446 370/280 |
| 2015/0305000 A1* | 10/2015 | Nguyen | H04L 5/14 370/329 |
| 2016/0174245 A1* | 6/2016 | Guo | H04W 72/12 370/280 |

OTHER PUBLICATIONS

CMCC, "On flexible TDD UL-DL configuration", R1-130535, 3GPP TSG RAN WG1 Meeting #72, Feb. 2013, 4 pages.

\* cited by examiner

[FIG. 1]
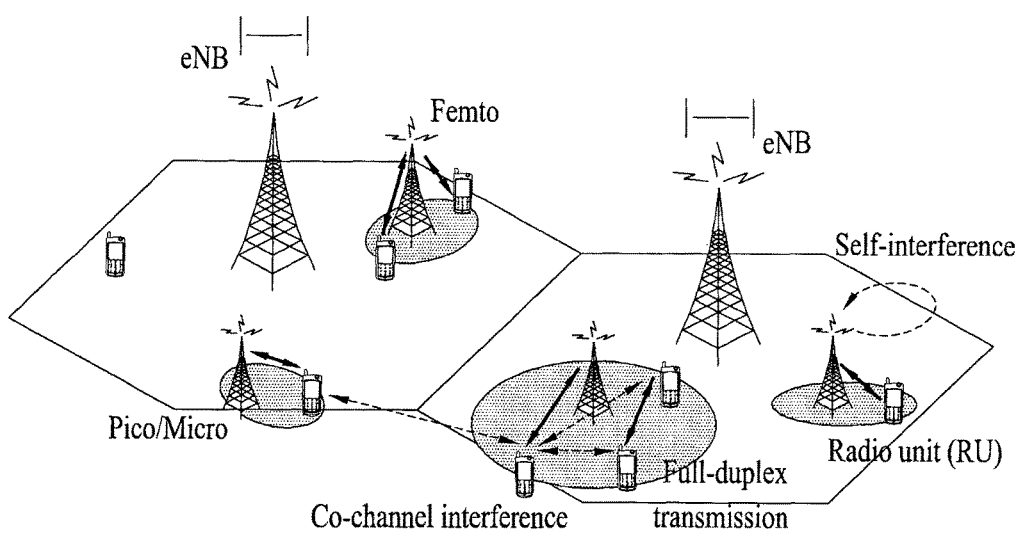

[FIG. 2]
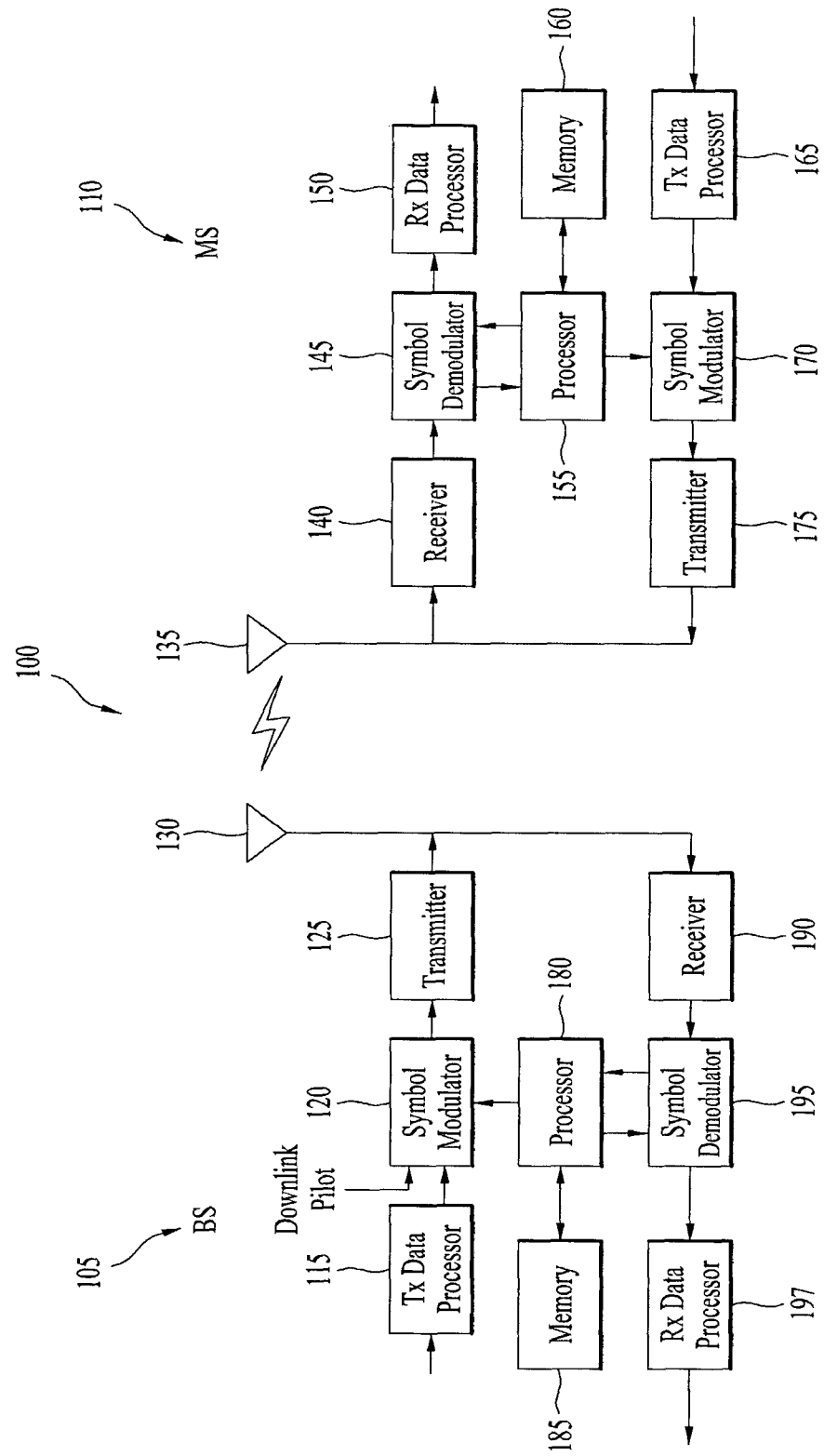

[FIG. 3]
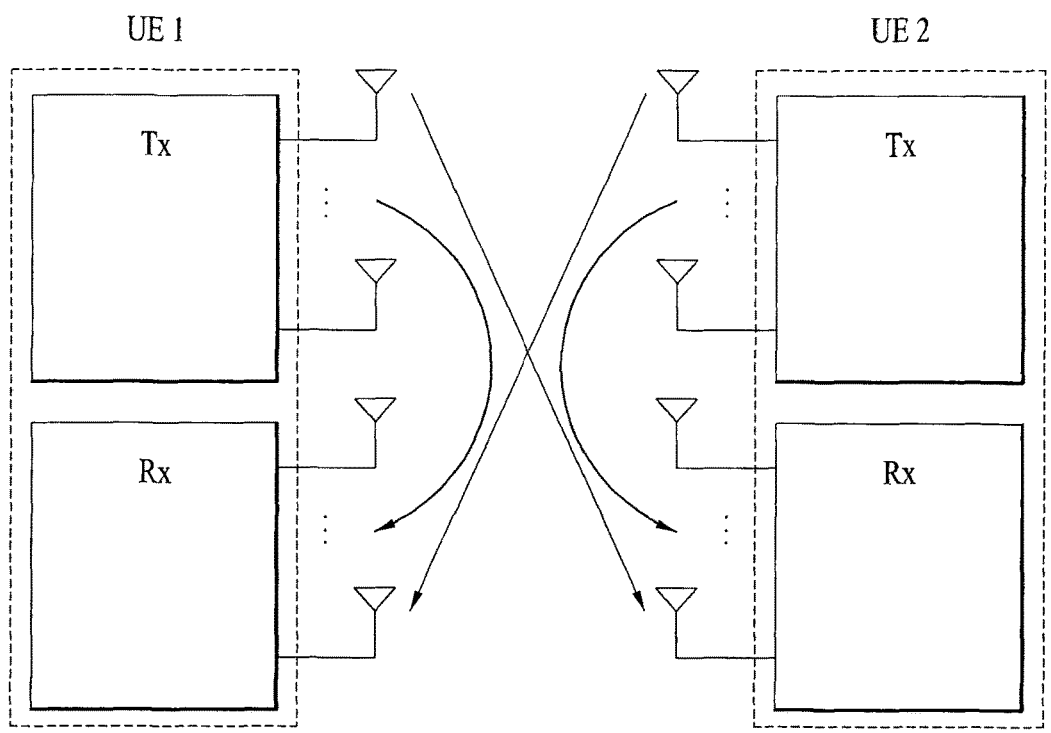

[FIG. 4]
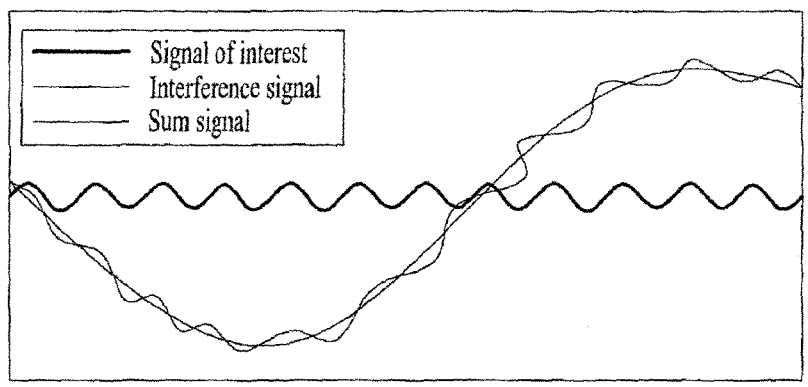
before ADC
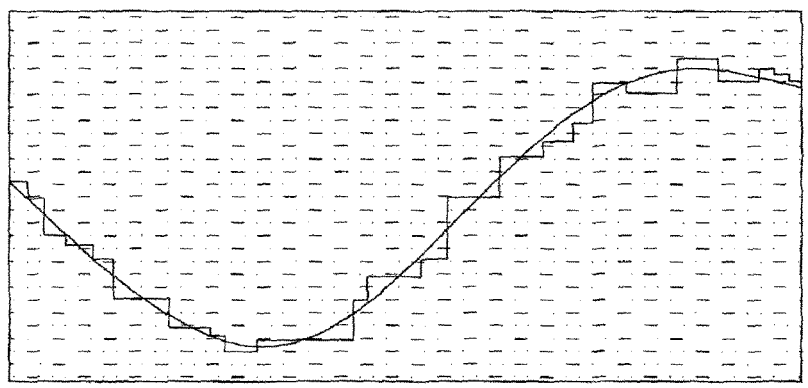
after ADC
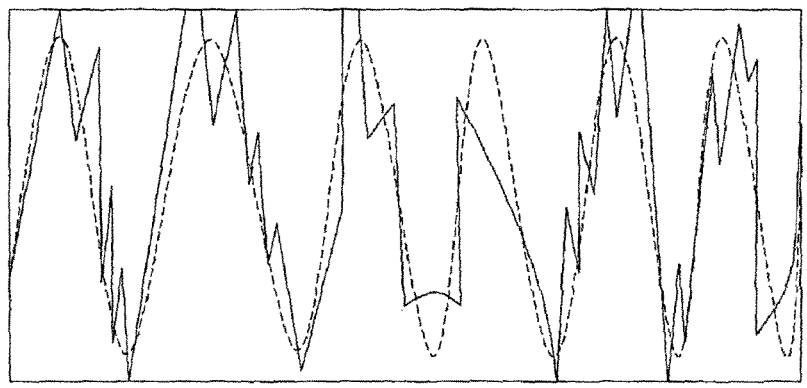
after digital
cancellation
and
scaling

[FIG. 5]
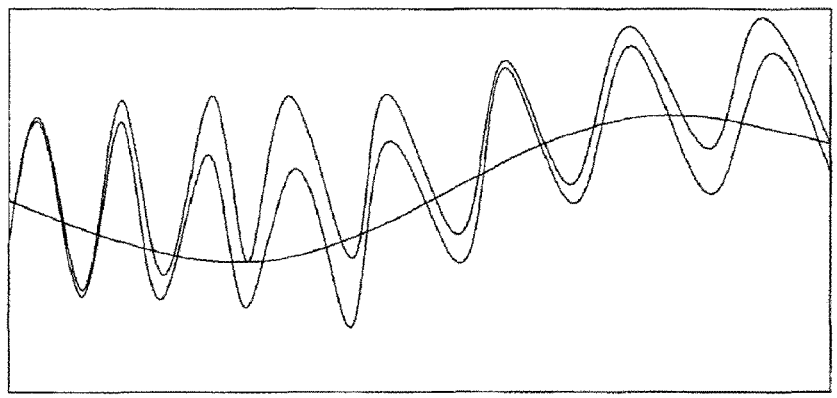
before ADC
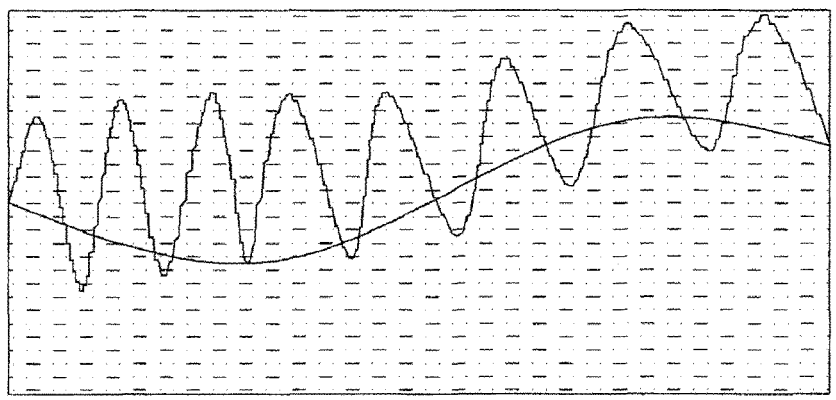
after ADC
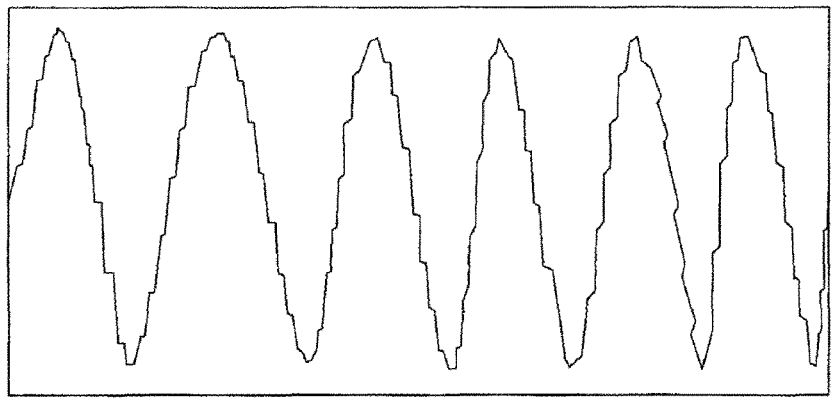
after digital cancellation and scaling

[FIG. 6]
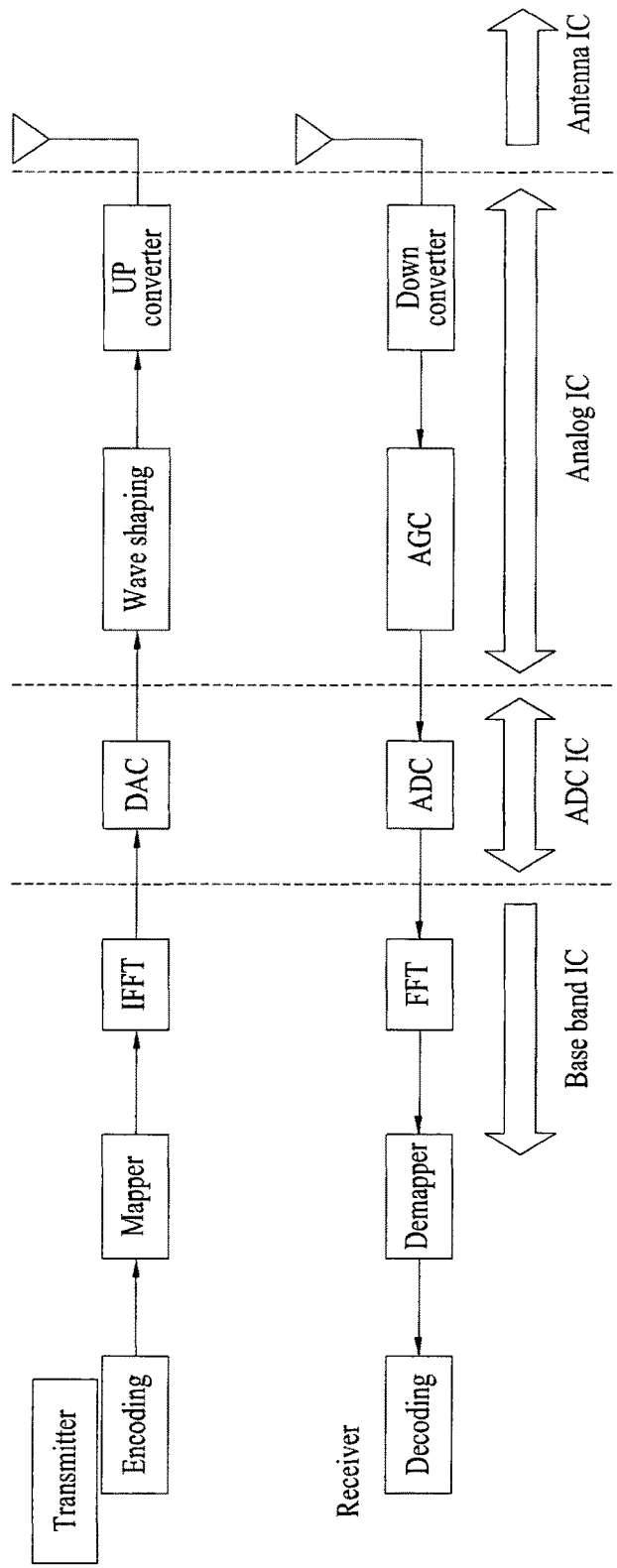

[FIG. 7]
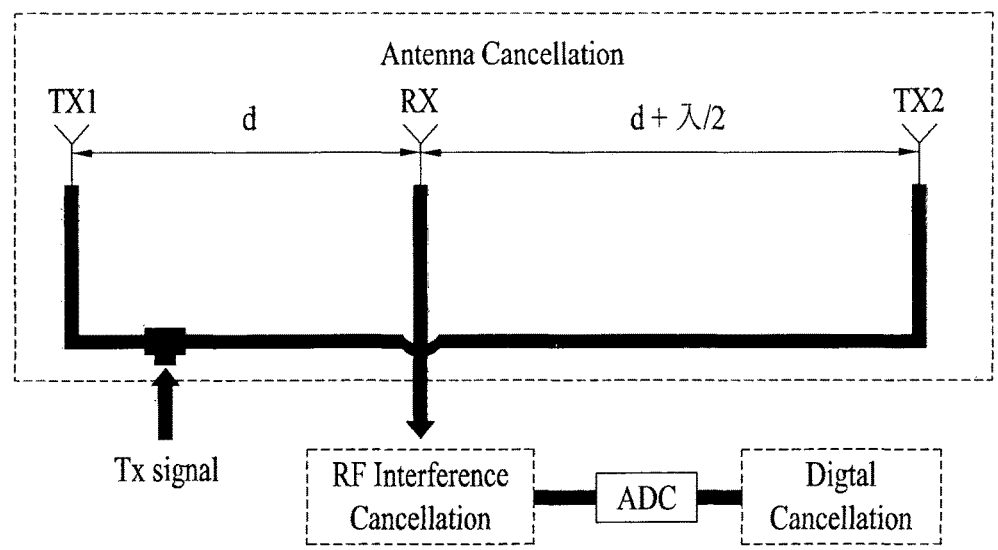
[FIG. 8]
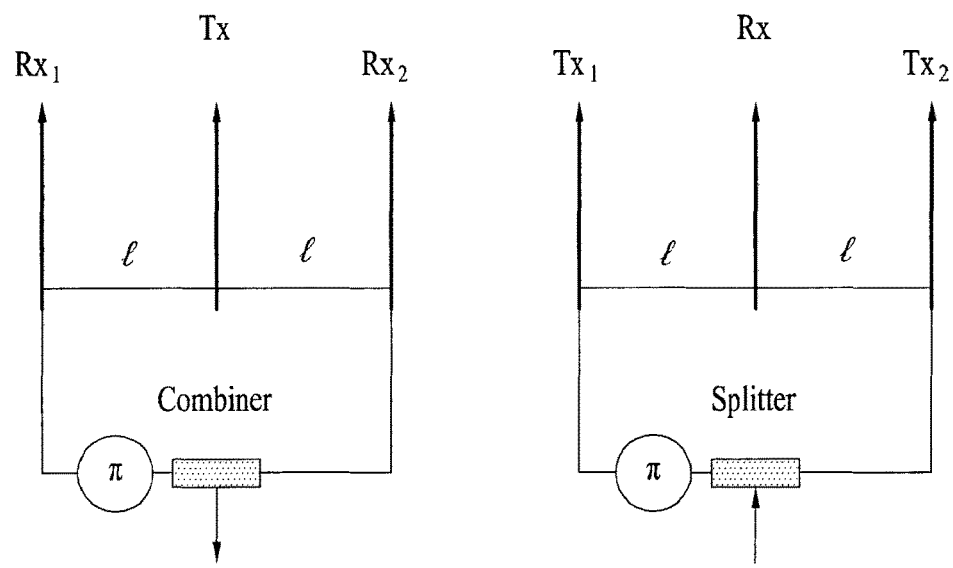

[FIG. 9]
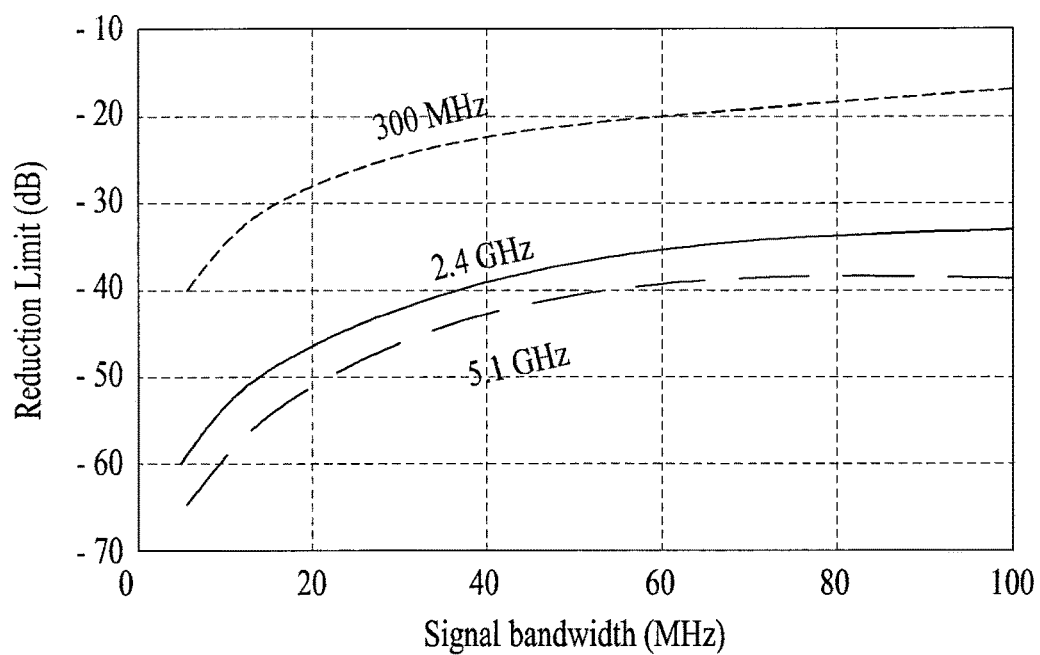

[FIG. 10]
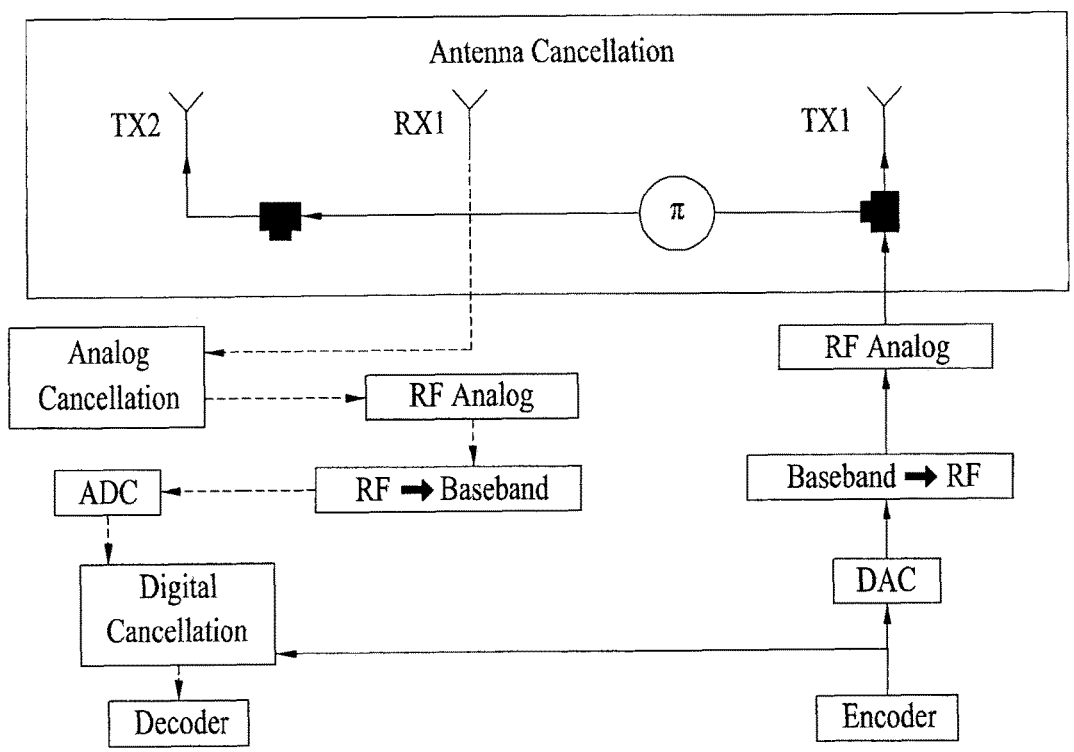

[FIG. 11]
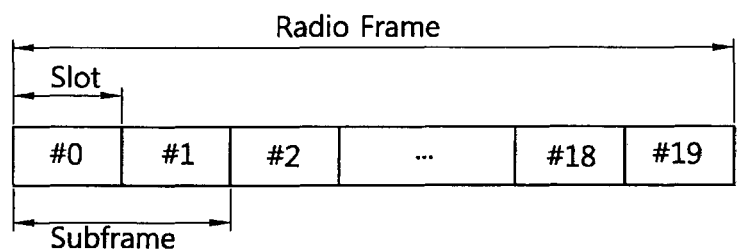
[FIG. 12]
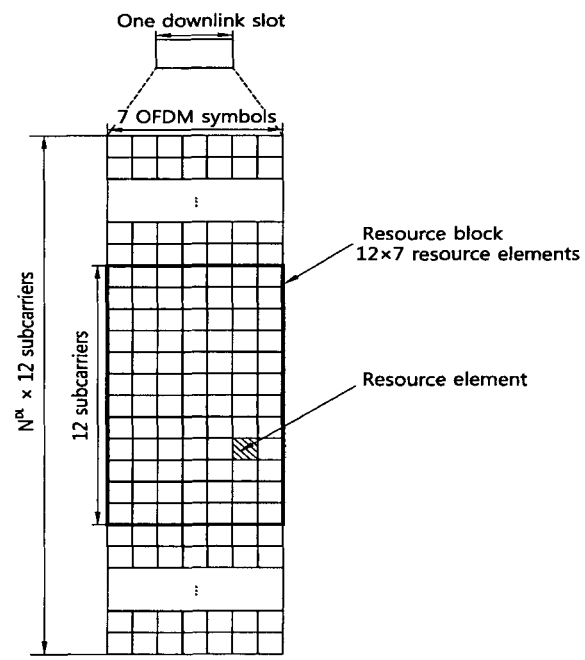

[FIG. 13]
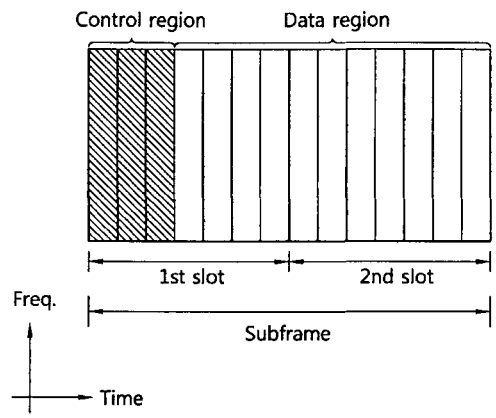
[FIG. 14]
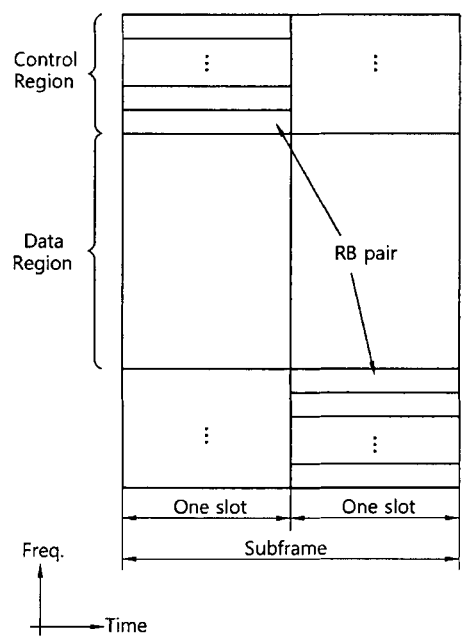
[FIG. 15]
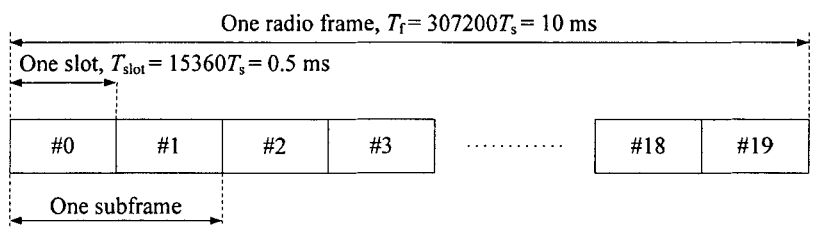

[FIG. 16]
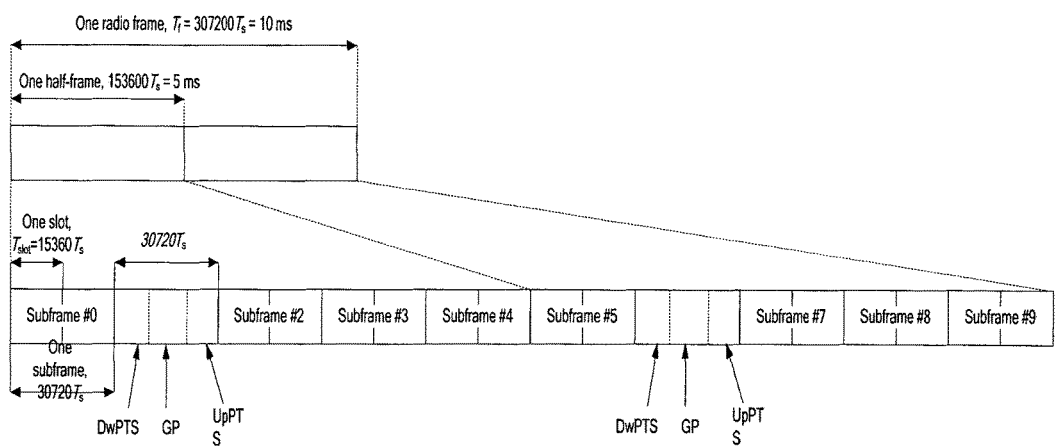

[FIG. 17]
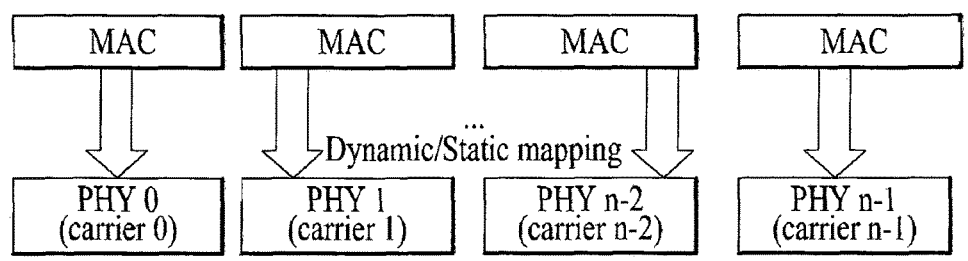
(a)
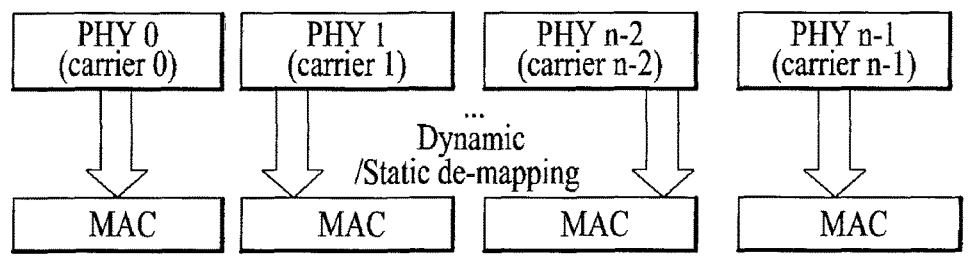
(b)

[FIG. 18]
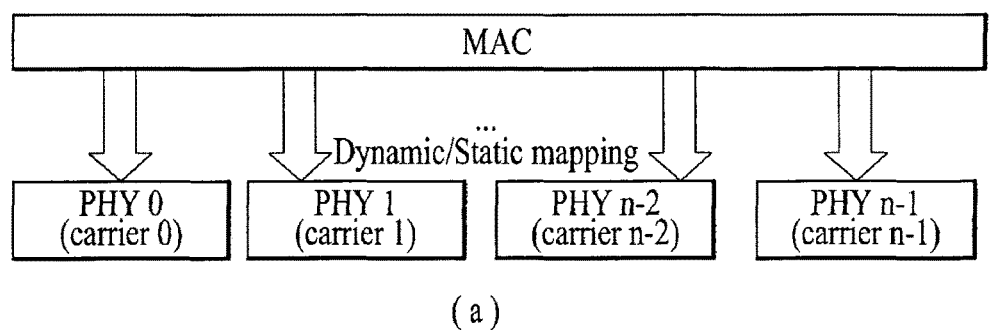
(a)
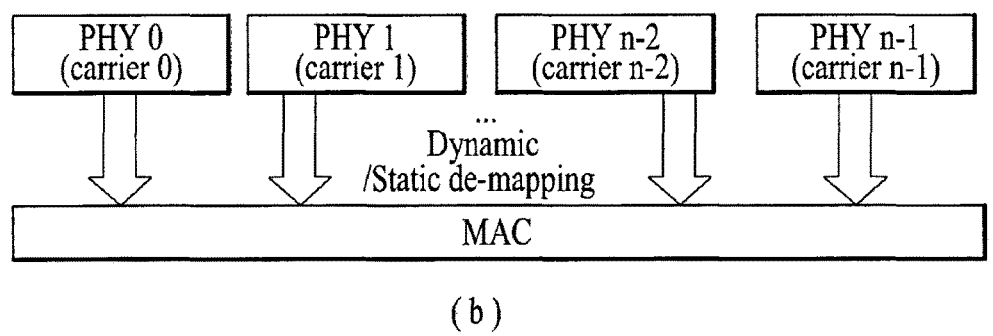
(b)

[FIG. 19]
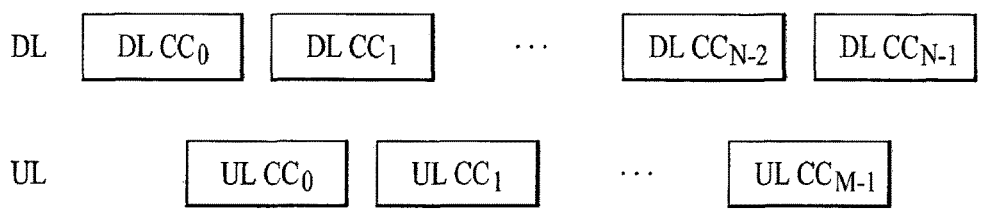
[FIG. 20]
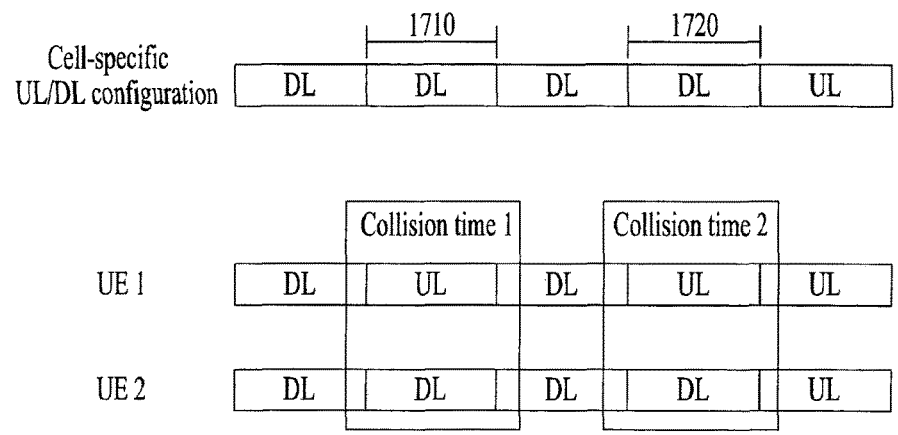

METHOD FOR ALLOWING USER EQUIPMENT (UE) TO PERFORM UE-FLEXIBLE TIME DIVISION DUPLEX (TDD) MODE COMMUNICATION IN NETWORK CONFIGURED TO SUPPORT UE-FLEXIBLE TDD MODE IN WHICH BASE STATION (BS) OPERATES IN FULL DUPLEX MODE AND UE OPERATES IN HALF DUPLEX MODE, AND THE USER EQUIPMENT (UE) FOR THE SAME

CROSS-REFERENCE TO RELATED APPLICATIONS

This application is the National Stage filing under 35 U.S.C. 371 of International Application No. PCT/KR2014/012810, filed on Dec. 24, 2014, which claims the benefit of U.S. Provisional Application No. 62/022,665, filed on Jul. 10, 2014, the contents of which are all hereby incorporated by reference herein in their entirety.

TECHNICAL FIELD

The present invention relates to wireless communication, and more particularly to a method for allowing a user equipment (UE) to perform UE-flexible TDD mode communication in a network configured to support the UE-flexible Time Division Duplex (TDD) mode in which a base station (BS) operates in a full duplex mode and a user equipment (UE) operates in a half duplex mode, and the user equipment (UE) for the same.

BACKGROUND ART

A full duplex radio (FDR) or full duplex communication scheme refers to a communication scheme for simultaneously supporting transmission and reception using the same resource in one user equipment (UE). In this case, the same resource refers to the same time and the same frequency. FDR communication or full duplex communication is referred to as two-way communication.

FIG. 1 is a diagram illustrating concept of a UE and a base station (BS), which support FDR. Referring to FIG. 1, in a network state that supports FDR, there are three types of interferences. First interference is intra-device self-interference. The intra-device self-interference refers to interference caused by signals that are transmitted from a transmission (Tx) antenna and received by a receiving (Rx) antenna in one BS or UE. Since the signals transmitted from the Tx antenna are transmitted with high power and a distance between the Tx antenna and the Rx antenna is small, the transmitted signals are received by the Rx antenna while attenuation is barely caused, and thus, are received with higher power than a desired signal. Second interference is UE to UE inter-link interference. In a network that supports FDR, the UE to UE inter-link interference is increasingly caused. The UE to UE inter-link interference refers to interference caused by uplink signals that are transmitted from a UE and received by an adjacently positioned UE. Third interference is BS to BS inter-link interference. Similarly, in a network state that supports FDR, BS to BS inter-link interference is increasingly caused. The BS to BS inter-link interference refers to interference caused by signals that are transmitted between BSs or heterogeneous BSs (pico, femto, and relay) in a HetNet state and received by an Rx antenna of another BS.

Among the three types of interferences, the intra-device self-interference (hereinafter, referred to as self-interference) is influence of interference caused only in FDR. In order to manage FDR, a most serious problem is cancellation of self-interference. However, methods for effectively cancelling self-interference in an FDR state have not been discussed in detail.

DISCLOSURE

Technical Problem

An object of the present invention is to provide a method for allowing a user equipment (UE) to perform UE-flexible Time Division Duplex (TDD) mode communication in a network configured to support a UE-flexible TDD mode in which a base station (BS) operates in a full duplex mode and the UE operates in a half duplex mode.

An object of the present invention is to provide a user equipment (UE) for performing UE-flexible TDD mode communication in a network configured to support a UE-flexible TDD mode in which a base station (BS) operates in a full duplex mode and the UE operates in a half duplex mode.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The objects of the present invention can be achieved by providing a method for performing communication by a user equipment (UE) in a UE-flexible Time Division Duplex (TDD) mode in a network configured to support the UE-flexible TDD mode in which a base station (BS) operates in a full duplex mode and the UE operates in a half duplex mode including: receiving information associated with a UE-flexible TDD mode support cell configured to support the UE-flexible TDD mode through a primary cell (PCell) from the base station (BS); and receiving a physical downlink shared channel (PDSCH) from the base station (BS) through the UE-flexible TDD mode support cell based on information. The method may further include: if the UE-flexible TDD mode support cell is configured as an intra-band with the primary cell (PCell) or a secondary cell (SCell), receiving data from the base station (BS) through the UE-flexible TDD mode support cell within a subframe on which the base station (BS) transmits a primary synchronization signal (PSS) or a secondary synchronization signal (SSS). The method may further include: decoding symbols starting from a first symbol of a corresponding subframe of the UE-flexible TDD mode support cell to receive the PDSCH. The information associated with the UE-flexible TDD mode support cell may be received through a 'UEFlexibleConfig' parameter contained in an 'RRCConnectionReconfiguration' message. The information associated with the UE-flexible TDD mode support cell may be received through a 'RadioResourceConfigCommonSCell' parameter contained in RadioResourceConfigCommon information element (IE).

If the UE-flexible TDD mode support cell is configured as an inter-band with the primary cell (PCell) or a secondary cell (SCell), receiving a Primary Synchronization Signal (PSS) or a Secondary Synchronization Signal (SSS) from the base station (BS) through the UE-flexible TDD mode support cell. The method may further include: transmitting a physical random access channel (PRACH) to the base station (BS) through the UE-flexible TDD mode support cell.

In accordance with another aspect of the present invention, a user equipment (UE) for performing communication in a UE-flexible Time Division Duplex (TDD) mode in a network configured to support the UE-flexible TDD mode in which a base station (BS) operates in a full duplex mode and the user equipment (UE) operates in a half duplex mode includes: a receiver configured to receive information associated with a UE-flexible TDD mode support cell that supports the UE-flexible TDD mode through a primary cell (PCell) from the base station (BS); and a processor configured to receive a physical downlink shared channel (PDSCH) from the base station (BS) through the UE-flexible TDD mode support cell based on information. If the UE-flexible TDD mode support cell is configured as an intra-band with the primary cell (PCell) or a secondary cell (SCell), the receiver may further receive data from the base station (BS) through the UE-flexible TDD mode support cell within a subframe on which the base station (BS) transmits a primary synchronization signal (PSS) or a secondary synchronization signal (SSS). The processor may decode symbols starting from a first symbol of a corresponding subframe of the UE-flexible TDD mode support cell to receive the PDSCH. The information associated with the UE-flexible TDD mode support cell may be received through a 'UEFlexibleConfig' parameter contained in an 'RRCConnectionReconfiguration' message. The information associated with the UE-flexible TDD mode support cell may be received through a 'RadioResourceConfigCommonSCell' parameter contained in a RadioResourceConfigCommon information element (IE).

If the UE-flexible TDD mode support cell is configured as an inter-band with the primary cell (PCell) and a secondary cell (SCell), the receiver receives a Primary Synchronization Signal (PSS) or a Secondary Synchronization Signal (SSS) from the base station (BS) through the UE-flexible TDD mode support cell. The user equipment (UE) may further include: a transmitter configured to transmit a physical random access channel (PRACH) to the base station (BS) through the UE-flexible TDD mode support cell.

Advantageous Effects

As is apparent from the above description, exemplary embodiments of the present invention can allow a user equipment (UE) to operate in an appropriate UE flexible TDD mode on the basis of the amount of traffic requested for each UE, resulting in increased cell throughput and efficiency.

In addition, according to the embodiments of the present invention, the cell for the UE specific flexible TDD mode is configured for the UE, and the UE can efficiently operate in the UE specific flexible TDD mode. If the UE operates in the UE specific flexible TDD mode, the BS does not transmit the last symbol of a PDSCH in the corresponding subframe in which SRS should be transmitted, so that self-interference of the BS can be removed and PDSCH Rx performance deterioration of the neighbor UEs can be solved.

It will be appreciated by persons skilled in the art thatthat the effects that could be achieved with the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 is a diagram illustrating concept of a user equipment (UE) and a base station (BS), which support full duplex radio (FDR).

FIG. 2 is a block diagram illustrating a structure of BS 105 and a UE 110 in a wireless communication system.

FIG. 3 is a diagram illustrating concept of self-interference.

FIG. 4 is a diagram illustrating signal distortion due to quantization errors and FIG. 5 is a diagram illustration signal recovery when quantization errors are low.

FIG. 5 shows an example in which an interference signal has lower power than a desired signal and the desired signal is recovered after the interference signal is cancelled.

FIG. 6 is a diagram for explanation of a scheme for cancelling self-interference.

FIG. 7 is a diagram for explanation of an antenna interference cancellation (IC) scheme using a distance between antennas.

FIG. 8 is a diagram for explanation of an antenna IC scheme using a phase shifter.

FIG. 9 illustrates interference cancelling performance according to a bandwidth and center frequency of a signal.

FIG. 10 is a diagram illustrating a system obtained by combining interference cancellation (IC) schemes.

FIG. 11 illustrates a structure of a radio frame of 3GPP LTE/LTE-A.

FIG. 12 illustrates a resource grid for one downlink slot of 3GPP LTE/LTE-A.

FIG. 13 illustrates a structure of downlink subframe of 3GPP LTE/LTE-A.

FIG. 14 illustrates a structure of uplink subframe of 3GPP LTE/LTE-A.

FIG. 15 illustrates a frame structure type 1 of 3GPP LTE/LTE-A.

FIG. 16 illustrates a frame structure type 1 of 3GPP LTE/LTE-A.

FIG. 17 (a) illustrates the concept that a plurality of MAC layers manages multiple carriers in an eNB and FIG. 17 (b) illustrates the concept that a plurality of MAC layers manages multiple carriers in a UE.

FIG. 18 (a) illustrates the concept that one MAC layer manages multiple carriers in an eNB and FIG. 18 (b) illustrates the concept that one MAC layer manages multiple carriers in a UE.

FIG. 19 is a diagram showing CCs configuring downlink and uplink connected to a UE or a relay node in an eNB or relay node area in an LTE-A system.

FIG. 20 illustrates the concept of UE-specific TDD (Time Division Duplex).

BEST MODE

Hereinafter, the preferred embodiments of the present invention will be described in detail with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on the assumption that the mobile communication system is the 3GPP LTE or LTE-A system, the following description may be applied to other mobile communication systems except for particular matters of the 3GPP LTE or LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a mobile station refers to a mobile or fixed type user equipment such as a user equipment (UE), an advanced mobile station (AMS) and a machine to machine (M2M) device. Also, it is assumed that the base station refers to a random node of a network terminal, such as Node B, eNode B, and access point (AP), which performs communication with the mobile station. In this specification, the base station may be used as a concept that includes a cell, sector, etc.

In a wireless communication system, a mobile station may receive information from a base station through a downlink (DL), and may also transmit information to the base station through an uplink. Examples of information transmitted from and received by the mobile station include data and various kinds of control information. Various physical channels exist depending on types and usage of information transmitted from or received by the mobile station.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system.

Although the following description will be based on the 3GPP LTE/LTE-A to clarify description of the present invention, it is to be understood that the technical spirits of the present invention is not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a block diagram illustrating configurations of a base station 105 and a mobile station 110 in a wireless communication system.

Although one base station 105, one mobile station 110 are shown for simplification of a wireless communication system 100, the wireless communication system 100 may include one or more base stations and/or one or more mobile stations.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 297. The mobile station 110 may include a Tx data processor 165, a symbol modulator 170, a transmitter 175, a transmitting and receiving antenna 135, a processor 155, a memory 160, a receiver 140, a symbol demodulator 145, and an Rx data processor 150. Although the antennas 130 and 135 are respectively shown in the base station 105 and the mobile station 110, each of the base station 105 and the mobile station 110 includes a plurality of antennas. Accordingly, the base station 105 and the mobile station 110 according to the present invention support a multiple input multiple output (MIMO) system. Also, the base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the mobile station through the antenna 130.

In the configuration of the mobile station 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the mobile station 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the mobile station 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the mobile station 110 by processing the data symbol estimation values.

The processors 155 and 180 of the mobile station 110 and the base station 105 respectively command (for example, control, adjust, manage, etc.) the operation at the mobile station 110 and the base station 105. The processors 155 and 180 may respectively be connected with the memories 160 and 185 that store program codes and data. The memories 160 and 185 respectively connected to the processor 180 store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the mobile station 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the mobile station and the network. The mobile station and the base station may exchange RRC messages with each another through the RRC layer.

Throughout this specification, the processor 155 of the UE 110 and the processor 180 of the BS 105 perform an operation for processing signals and data except for a function of receiving or transmitting signals by the UE 110 and the BS 105 or a storing function. However, hereinafter, for convenience of description, the processors 155 and 180 will not be specially stated. Unless the processors 155 and 180 are not stated, a series of operations such as data processing but not the function of transmitting or receiving signals and the storing function may be performed.

FIG. 3 is a diagram illustrating concept of self-interference.

As illustrated in FIG. 3, a signal transmitted from a UE is received by an Rx antenna of the UE and acts as interference. This interference has different characteristic from other interferences. According to the first characteristic, a signal that acts as interference may be considered as a completely known signal. According to the second characteristic, power of a signal that acts as interference is very high compared with a desired signal. Due to this point, even if a signal that acts as interference is completely known, the interference cannot be completely cancelled at a receiver. The receiver uses an analog to digital converter (ADC) in order to convert a signal received by the receiver into a digital signal. In general, the ADC measures power of a received signal, adjusts a power level of the received signal according to the measured power, quantizes the received signal, and then, converts the signal into a digital signal. However, since an interference signal is received with higher power than a desired signal, the signal characteristic of the desired signal is covered by a quantization level during the quantization, and thus, the signal cannot be recovered.

FIG. 4 is a diagram illustrating signal distortion due to quantization errors. FIG. 5 is a diagram illustration signal recovery when quantization errors are low.

In FIG. 4, for example, quantization is assumed to be 4 bits. As seen from FIG. 4, when an interference signal has much higher power than a desired signal, if quantization is performed, even if the interference signal is cancelled, the desired signal is highly distorted. On the other hand, FIG. 5 shows an example in which an interference signal has lower power than a desired signal and the desired signal is recovered after the interference signal is cancelled. In this situation, a scheme for cancelling self-interference may be classified into 4 schemes according to a position in which the scheme is performed.

FIG. 6 is a diagram for explanation of a scheme for cancelling self-interference.

Referring to FIG. 6, the scheme for cancelling self-interference may be classified into 4 schemes of a baseband IC scheme, an ADC IC scheme, an analog IC scheme, and an antenna IC scheme according to a position in which the scheme is performed.

FIG. 7 is a diagram for explanation of an antenna IC scheme using a distance between antennas.

The antenna IC scheme can be implemented via a simplest method among all IC schemes and can be performed as shown in FIG. 7. That is, one UE cancels interference using three antennas and uses two antennas as a Tx antenna and one antenna as an Rx antenna among the three antennas. The two Tx antennas are installed at a distance difference corresponding to about wavelength/2 based on the Rx antenna in order to receive a signal transmitted from each Tx antenna as a signal, a phase of which is inversed, in terms of the Rx antenna. Accordingly, an interference signal among signals that are lastly received by the Rx antenna converges toward 0. Alternatively, in order to inverse a phase of a second Tx antenna, an interference signal can be cancelled using a phase shifter as illustrated in FIG. 8 without using a distance between antennas as illustrated in FIG. 7.

FIG. 8 is a diagram for explanation of an antenna IC scheme using a phase shifter.

In FIG. 8, a left diagram illustrates a scheme for cancelling self-interference using two Rx antennas and a right diagram illustrates a scheme for cancelling interference using two Tx antennas. These antenna interference cancelling schemes are affected by a bandwidth and center frequency of a transmitted signal. As a bandwidth of a transmitted signal is reduced and as center frequency of the transmitted signal is increased, interference cancelling performance is more strengthened. FIG. 9 illustrates interference cancelling performance according to a bandwidth and center frequency of a signal. As illustrated in FIG. 9, as a bandwidth of a transmitted signal is reduced and a center frequency of the transmitted signal is increased, interference cancelling performance is more strengthened.

An ADC IC scheme will now be described. The ADC IC scheme refers to a technology for easily cancelling interference by maximizing the performance of an ADC that has a most serious problem in that interference cannot be cancelled even if an interference signal is pre-known. Although it is disadvantageous in that the ADC IC scheme cannot be applied due to quantization bit limitation of the ADC for actual embodiment, self-interference cancellation performance required by a trend of gradually improving ADC performance may be lowered.

An analog IC scheme will now be described. The analog IC scheme is a scheme for cancelling interference prior to an ADC and cancels self-interference using an analog signal. The analog IC scheme may be performed in a radio frequency (RF) region or performed in an IF region. Interference is cancelled simply by phase and time-lagging a transmitted analog signal and subtracting the analog signal from a signal received by an Rx antenna. The analog IC scheme is advantageous in that only one Tx antenna and one Rx antenna are required unlike the antenna IC scheme. However, since processing is performed using an analog signal, distortion may further occur due to complex implementation and circuit characteristic, thereby highly changing interference cancellation performance.

A digital IC scheme will now be described. The digital IC scheme refers to a scheme for cancelling interference after an ADC and includes any interference cancelation performed in a base band region. As a simplest scheme is embodied by subtracting a transmitted digital signal from a received digital signal. Alternatively, a UE or BS that transmits signals using multi antennas may perform beamforming or precoding so as not to receive the transmitted signal by an Rx antenna. In this regard, when these schemes are performed in a base band, these schemes may also be classified as digital IC. However, the digital IC is possible when a signal modulated in a digital form is quantized so as to recover information about a desired signal. Accordingly, the digital IC is disadvantageous in that an amplitude difference of signal power between a desired signal and an interference signal obtained by cancelling interference via one or more scheme among the above schemes needs to be within an ADC range in order to perform the digital IC.

FIG. 10 is a diagram illustrating a system obtained by combining interference cancellation (IC) schemes.

The system illustrated in FIG. 10 is a system to which the above schemes are simultaneously applied and overall interference cancellation performance is improved by combining interference cancellation schemes of respective regions. A scheme proposed according to the present invention proposes a series of procedures and frame structure for cancelling self-interference via a simplest antenna IC scheme among the above schemes and improving overall cell throughput. However, when all of the analog, ADC, and digital IC schemes as well as the antenna IC schemes are applied, even if the scheme proposed according to the present invention, cell throughput may also be improved.

General analog cancellation is achieved via a subtraction method prior to a low noise amplifier (LNA) of a receiver using a signal after a power amplifier (PA) of a transmitter. This is because influence of a signal received by an actual antenna can be effectively reflected only when the signal is extracted from a last node of the transmitter.

FIG. 11 illustrates a structure of a radio frame of 3GPP LTE/LTE-A.

In FIG. 11, a radio frame includes 10 subframes. A subframe includes two slots in time domain. A time for transmitting one subframe is defined as a transmission time interval (TTI). For example, one subframe may have a length of 1 millisecond (ms), and one slot may have a length of 0.5 ms. One slot includes a plurality of orthogonal frequency division multiplexing (OFDM) symbols in time domain. Since the 3GPP LTE uses the OFDMA in the downlink, the OFDM symbol is for representing one symbol period. The OFDM symbol may also be referred to as an SC-FDMA symbol or a symbol period. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

FIG. 12 illustrates a resource grid for one downlink slot of 3GPP LTE/LTE-A.

In FIG. 12, a downlink slot includes a plurality of OFDM symbols in time domain. It is described herein that one downlink slot includes 7 OFDM symbols, and one resource block (RB) includes 12 subcarriers in frequency domain as an example. However, the present invention is not limited thereto. Each element on the resource grid is referred to as a resource element (RE). One RB includes 12×7 REs. The number NDL of RBs included in the downlink slot depends on a downlink transmit bandwidth. The structure of an uplink slot may be same as that of the downlink slot.

FIG. 13 illustrates a structure of downlink subframe of 3GPP LTE/LTE-A.

In FIG. 13, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of downlink control channels used in the 3GPP LTE includes a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. Control information transmitted through the PDCCH is referred to as downlink control information (DCI). The DCI includes uplink or downlink scheduling information or includes an uplink transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined according to a correlation between the number of CCEs and the coding rate provided by the CCEs. The BS determines a PDCCH format according to a DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for system information (more specifically, a system information block (SIB) to be described below), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

FIG. 14 illustrates a structure of uplink subframe of 3GPP LTE/LTE-A.

In FIG. 14, an uplink subframe can be divided in a frequency domain into a control region and a data region. The control region is allocated with a physical uplink control channel (PUCCH) for carrying uplink control information. The data region is allocated with a physical uplink shared channel (PUSCH) for carrying user data. To maintain a single carrier property, one UE does not simultaneously transmit the PUCCH and the PUSCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary.

FIG. 15 illustrates a frame structure type 1 of 3GPP LTE/LTE-A.

Frame Structure Type 1 (FDD)

Frame structure type 1 is applicable to both full duplex and half duplex FDD. Each radio frame is $T_f=307200 \cdot T_s=10$ ms long and consists of 20 slots of length $T_{slot}=15360 \cdot T_s=0.5$ ms, numbered from 0 to 19. A subframe is defined as two consecutive slots where subframe i consists of slots 2i and 2i+1 For FDD, 10 subframes are available for downlink transmission and 10 subframes are available for uplink transmissions in each 10 ms interval. Uplink and downlink transmissions are separated in the frequency domain. In half-duplex FDD operation, the UE cannot transmit and receive at the same time while there are no such restrictions in full-duplex FDD.

FIG. 16 illustrates a frame structure type 1 of 3GPP LTE/LTE-A.

Frame Structure Type 2 (TDD)

Frame structure type 2 is applicable to TDD. Each radio frame of length $T_f=307200 \cdot T_s=10$ ms consists of two half-frames of length each. Each $153600 \cdot T_s=5$ ms half-frame consists of five subframes of length $30720 \cdot T_s=1$ ms. The supported uplink-downlink configurations are listed in Table 7 where, for each subframe in a radio frame, "D" denotes the subframe is reserved for downlink transmissions, "U" denotes the subframe is reserved for uplink transmissions and "S" denotes a special subframe with the three fields DwPTS, GP and UpPTS. The length of DwPTS and UpPTS is given by Table 6 subject to the total length of DwPTS, GP and UpPTS being equal to $30720 \cdot T_s=1$ ms. Each subframe i is defined as two slots, 2i and 2i+1 of length $T_{slot}=15360 \cdot T_s=0.5$ ms in each subframe. Uplink-downlink configurations with both 5 ms and 10 ms downlink-to-uplink switch-point periodicity are supported.

In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission.

Table 1 illustrates configuration of special subframe (lengths of DwPTS/GP/UpPTS).

TABLE 1

| | Normal cyclic prefix in downlink | | | Extended cyclic prefix in downlink | | |
| --- | --- | --- | --- | --- | --- | --- |
| | | UpPTS | | | UpPTS | |
| | | Normal | | | | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |

TABLE 1-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Table 2 illustrates Uplink-downlink configurations.

TABLE 2

| Uplink-downlink-Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

For Frame Structure type 1, an HARQ-ACK received on the PHICH assigned to a UE in subframe i is associated with the PUSCH transmission in subframe i-4. For Frame Structure type 2 UL/DL configuration 1-6, an HARQ-ACK received on the PHICH assigned to a UE in subframe i is associated with the PUSCH transmission in the subframe i-k as indicated by the following table 3.

The BS may inform a UE of UL/DL configuration through a semi-static RRC message. In more detail, the BS may inform the UE of the UL/DL configuration through a 'subframeassignment' field of a TDD-Config IE (Information Element).

<UE HARQ-ACK Procedure>

For Frame Structure type 2 UL/DL configuration 1-6, an HARQ-ACK received on the PHICH assigned to a UE in subframe i is associated with the PUSCH transmission in the subframe i-k as indicated by the following table 3.

For Frame Structure type 2 UL/DL configuration 0, an HARQ-ACK received on the PHICH in the resource corresponding to $I_{PHICH}=0$, assigned to a UE in subframe i is associated with the PUSCH transmission in the subframe i-k as indicated by the following table 8.3-1. If, for Frame Structure type 2 UL/DL configuration 0, an HARQ-ACK received on the PHICH in the resource corresponding to $I_{PHICH}=1$, assigned to a UE in subframe i is associated with the PUSCH transmission in the subframe i-6.

Table 3 illustrates k for TDD configurations 0-6.

TABLE 3

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | | 7 | 4 | | | | 7 | 4 | |
| 1 | | | 4 | | | 6 | | | 4 | 6 |
| 2 | | | 6 | | | | | 6 | | |
| 3 | 6 | | | | | | | 6 | 6 | |
| 4 | | | | | | | | 6 | 6 | |
| 5 | | | | | | | | 6 | | |
| 6 | 6 | | 4 | | | | 7 | 4 | | 6 |

The physical layer in the UE shall deliver indications to the higher layers as follows:

For downlink subframe i, if a transport block was transmitted in the associated PUSCH subframe then:
  if ACK is decoded on the PHICH corresponding to the transport block in subframe i, ACK for that transport block shall be delivered to the higher layers;
  else NACK for that transport block shall be delivered to the higher layers.

For downlink subframe i, in case of a retransmission in the associated PUSCH subframe, if a transport block was disabled in the associated PUSCH subframe then ACK for that transport block shall be delivered to the higher layers.

<PHICH Assignment Procedure>

For PUSCH transmissions scheduled from serving cell c in subframe n, a UE shall determine the corresponding PHICH resource of serving cell c in subframe n+$k_{PHICH}$, where $k_{PHICH}$ is always 4 for FDD and is given in table 4 for TDD. For subframe bundling operation, the corresponding PHICH resource is associated with the last subframe in the bundle.

Table 4 illustrates $k_{PHICH}$ for TDD.

TABLE 4

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | | 4 | 7 |

The PHICH resource is identified by the index pair $(n_{PHICH}^{group}, n_{PHICH}^{seq})$ where $n_{PHICH}^{group}$ is the PHICH group number and $n_{PHICH}^{seq}$ is the orthogonal sequence index within the group as defined by:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

where $n_{DMRS}$ is mapped from the cyclic shift for DMRS field (according to Table 5) in the most recent PDCCH with uplink DCI format [4] for the transport block(s) associated with the corresponding PUSCH transmission. $n_{DMRS}$ shall be set to zero, if there is no PDCCH with uplink DCI format for the same transport block, and i. if the initial PUSCH for the same transport block is semi-persistently scheduled, or ii. if the initial PUSCH for the same transport block is scheduled by the random access response grant.

$N_{SF}^{PHICH}$ is the spreading factor size used for PHICH modulation as described in section 6.9.1 in [3].

$$I_{PRB\_RA} = \begin{cases} I_{PRB\_RA}^{lowest\_index} & \text{for the first TB of a PUSCH with associated PDCCH or for the case of no associated PDCCH when the number of negatively acknowledged TBs is not equal to the number of TBs indicated in the most recent PDCCH associated with the corresponding PUSCH} \\ I_{PRB\_RA}^{lowest\_index} + 1 & \text{for a second TB of a PUSCH with associated PDCCH} \end{cases}$$

where $I_{PRB\_RA}^{lowest\_index}$ is the lowest PRB index in the first slot of the corresponding PUSCH transmission $n_{PHICH}^{group}$ is the number of PHICH groups configured by higher layers as described in section 6.9 of [3], $$I_{PHICH} = \begin{cases} 1 & \text{for TDD UL/DL configuration 0 with PUSCH transmission in subframe } n = 4 \text{ or } 9 \\ 0 & \text{otherwise} \end{cases}$$

Table 5 illustrates Mapping between $n_{DMRS}$ and the cyclic shift for DMRS field in PDCCH with uplink DCI format in [4]

TABLE 5

| Cyclic Shift for DMRS Field in PDCCH with uplink DCI format in [4] | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

While 3GPP LTE Release 8 (including Release 9) system is based on transmission and reception on a single carrier band based on a scalable band size, the LTE-advanced system may support downlink transmission using frequency-domain resources (that is, subcarriers or physical resource blocks (PRBs)) on one or more carrier bands in the same time-domain resources (that is, in subframe units) from a cell or an eNB to a UE.

Similarly, the LTE-advanced system may support uplink transmission using frequency-domain resources (that is, subcarriers or physical resource blocks (PRBs)) on one or more carrier bands in the same time-domain resources (that is, in subframe units) from an arbitrary UE to a cell or an eNB. These are referred to as downlink carrier aggregation and uplink carrier aggregation, respectively. The configuration of a physical layer (PHY) and a layer 2 (layer 2 (MAC)) for transmission of a plurality of allocated uplink or downlink carrier bands from the viewpoint of an arbitrary cell or UE is shown in FIGS. 17 and 18.

FIG. 17 (a) illustrates the concept that a plurality of MAC layers manages multiple carriers in an eNB and FIG. 17 (b) illustrates the concept that a plurality of MAC layers manages multiple carriers in a UE.

As shown in FIGS. 17 (a) and 17 (b), the MAC layers may control the carriers 1:1. In a system supporting multiple carriers, the carriers may be contiguously or non-contiguously used, regardless of uplink/downlink. A TDD system is configured to manage N carriers each including downlink and uplink transmission and an FDD system is configured to respectively use multiple carriers in uplink and downlink. The FDD system may support asymmetric carrier aggregation in which the numbers of aggregated carriers and/or the bandwidths of carriers in uplink and downlink are different.

FIG. 18 (a) illustrates the concept that one MAC layer manages multiple carriers in an eNB and FIG. 18 (b) illustrates the concept that one MAC layer manages multiple carriers in a UE.

Referring to FIGS. 18 (a) and 18 (b), one MAC layer manages one or more frequency carriers so as to perform transmission and reception. Since frequency carriers managed by one MAC layer need not be contiguous, more flexible resource management is possible. In FIGS. 18 (a) and 18 (b), one PHY layer means one CC for convenience. Here, one PHY layer does not necessarily mean an independent radio frequency (RF) device. In general, one independent RF device means one PHY layer, but is not limited thereto. One RF device may include several PHY layers.

A series of physical downlink control channels (PDCCHs) for transmitting control information of L1/L2 control signaling generated from a packet scheduler of a MAC layer supporting the configurations of FIGS. 18 (a) and 18 (b) may be mapped to physical resources in a separate CC to be transmitted. At this time, in particular, PDCCHs of grant-related control information or channel assignment associated with transmission of a unique PDSCH or physical uplink shared channel (PUSCH) of a separate UE are divided according to CCs on which the physical shared channel is transmitted, are encoded and are generated as divided PDCCHs, which are referred to as separate coded PDCCHs. As another method, control information for transmitting the physical shared channels of several component carriers may be configured as one PDCCH to be transmitted, which are referred to as joint coded PDCCHs.

In order to support downlink or uplink carrier aggregation, an eNB may assign CCs to be measured and/or reported as a preparation process of establishing a link for transmitting a PDCCH and/or a PDSCH or if a link is established such that a PDCCH and/or a PDSCH for transmitting data and control information are transmitted according to situations on a per specific UE or relay node basis. This is expressed by CC assignment for an arbitrary purpose. At this time, an eNB may transmit CC assignment information via a series of UE-specific or RN-specific RRC signaling (UE-specific or RN-specific signaling) according to dynamic characteristics of control in the case in which the CC assignment information is controlled by L3 radio resource management (RRM) or transmit CC assignment information via a series of PDCCHs as L1/L2 control signaling or via a series of dedicated physical control channels for transmitting only control information.

As another method, in the case in which CC assignment information is controlled by a packet scheduler, the CC assignment information may be transmitted via a series of PDCCHs as L1/L2 control signaling or via a series of dedicated physical control channels for transmitting only control information or PDCCHs of an L2 MAC message format.

Hereinafter, a method of performing timing synchronization between carriers when one cell supports multiple carriers in a wireless communication system will be described. As an example of a wireless communication system, in particular, in an LTE-A system, setting of a subframe boundary between carriers upon operation of a UE and a cell supporting carrier aggregation is proposed. The present invention is described based on the LTE-A system, but is applicable to other wireless communication standards to which the same concept is applied.

FIG. 19 is a diagram showing CCs configuring downlink and uplink connected to a UE or a relay node in an eNB or relay node area in an LTE-A system.

Referring to FIG. 19, downlink CCs and uplink CCs assigned by an arbitrary eNB or an arbitrary relay node are shown. For example, the number of downlink CCs is N and the number of uplink CCs is M. Here, the number of downlink CCs may be equal to or different from the number of uplink CCs.

In the LTE-A system, downlink CCs may be classified into three types. As a first type CC, there is a backward compatible CC supporting backward compatibility with an LTE rel-8 UE. As a second type CC, there is a non-backward compatible CC which cannot be accessed by LTE UEs, that is, which support only LTE-A UEs. The first type CC and second type CC may be Stand-alone CC (or Stand-alone Carrier, Stand-alone cell). In addition, as a third type CC, there is an Non-Stand-alone CC.

The backward compatible CC which is the first type CC (or primary cell, Pcell) is a CC on which not only a PDCCH and a PDSCH but also a reference signal (RS), a primary-synchronization channel (P-SCH)/secondary-synchronization channel (S-SCH) and primary-broadcast channel (P-BCH) are transmitted according to an LTE structure in order to enable access of an LTE UE. The non-backward compatible CC which is the second type CC (secondary cell, Scell) is a CC on which a PDCCH, a PDSCH, an RS, a P-SCH/S-SCH and a P-BCH are transmitted in a modified format in order to disable access of an LTE UE.

The first type CC (that is, the backward compatible CC) enables an LTE UE and an LTE-A UE to access a cell (or eNB) and the second type CC (that is, the non-backward compatible CC) enables only an LTE-A UE to access a cell. Non-Stand-alone CC which is the third type CC disables a UE to access a cell and is referred to as a subsidiary CC of the first type CC or the second type CC. A P-SCH/S-SCH, a P-BCH and a PDCCH are not transmitted on the Non-Stand-alone CC which is the third type CC and all resources of the third type CC may be used to transmit a PDSCH to a UE or may operate in a sleep mode when the resources are not scheduled with respect to the PDSCH. An eNB or a relay node does not transmit control information to a UE via the third type CC.

That is, the first type CC and the second type CC may be of a stand-alone CC type necessary to establish one cell or capable of configuring one cell and the third type CC may be of a non-stand-alone CC type which coexists with one or more stand-alone CCs.

In an LTE-A system, if an arbitrary cell (or eNB) supports downlink via multiple downlink CCs, subframe synchronization between downlink CCs is generally performed. However, in the present invention, a timing offset may be set between the non-stand-alone CC such as the third type CC and the stand-alone CC such as the first type CC (backward compatible CC) or the second type CC (non-backward compatible CC), thereby reducing buffer overhead of a UE and saving power.

UE Specific TDD

In a conventional Time Division Duplex (TDD) system, the BS and the UE may operate in a half duplex mode while simultaneously having the same cell-specific uplink/downlink (UL/DL) configuration. Therefore, the above-mentioned system structure has difficulty in UE-specifically reflecting the amount of DL or UL traffic required for each UE. In order to address this problem, it may be necessary to UE-specifically establish/manage UL/DL configuration. That is, since individual UEs of one cell may request different amounts of traffic, different UL/DL configurations may be achieved according to the amount of traffic required for each UE, UL/DL configuration is dynamically or semi-statically reflected according to the amount of traffic and is established in each UE through a control channel or RRC (Radio Resource Control) signaling, resulting in increased cell efficiency.

FIG. 20 is a conceptual diagram illustrating a UE-specific TDD (Time Division Duplex) concept.

Referring to FIG. 20, UEs of one cell are basically based on the cell-specific UL/DL configuration, and uplink (UL) traffic of UE1 is additionally requested, so that UE 1 transmits a UL signal/UL subframe during a downlink (DL) time/DL subframe. In this case, as shown in FIG. 20, two collision times 1710 and 1720 may occur. In Time Duration 1 (1710), BS operates in a DL mode, UE 2 operates in the DL mode, and UE 1 operates in an uplink (UL) mode, so that the base station (BS) must receive a UL signal transmitted from the time duration 1 (1710). The above-mentioned operations are also applied to the other case of Time Duration 2 (1720). For this purpose, the BS can remove self-interference, and may operate in the full duplex mode. That is, in order to operate UE specific TDD, the BS may cancel self-interference and needs to operate in the full duplex mode.

In order to adaptively reflect each traffic requested by the UE, different UL/DL configurations may be assigned to individual UEs. That is, if traffic requested by a specific UE at a specific time is changed from DL reception to UL transmission, necessary information can be transmitted only to a limited subframe through cell-specific UL/DL configuration within a specific period, so that it is difficult to guarantee a Quality of Service (QoS) required for each UE. Therefore, a unique UL/DL configuration is assigned to each UE in a UE-specific TDD, such that QoS and cell efficiency can be increased.

On the other hand, according to the method for operating/managing a UE-specific TDD, a cell supporting the UE-specific TDD can be operated in a stand-alone manner, and can also be operated in a non stand-alone manner in conjunction with the legacy cell (e.g., a TDD cell or FDD cell). The scheme in which the cell operates in the stand-alone manner has the following advantages. That is, the cell independently operates so that UE accessibility is high, and the intra and/or inter band CA (Carrier Aggregation) is not considered to be a basic operation environment so that the above-mentioned scheme can be implemented a single RF chain only. In addition, UL/DL control channels for managing the corresponding cell are transmitted in the corresponding cell, so that latency and signaling overhead can be reduced.

In the case of a non-stand-alone carrier (or a non-stand-alone cell), the cell for supporting the UE-specific TDD should always be accompanied with the legacy cell (TDD cell or FDD cell) (i.e., a cell operated in a TDD mode in a PCell and an SCell or a cell operated in an FDD mode), so that the UE must approach the cell supporting the UE-specific TDD only through the legacy cell. However, if the cell operates in the non-stand-alone manner, and if a control channel for the UE-specific TDD cell is transmitted in the legacy cell according to the cross scheduling scheme, reception (Rx) performance deterioration of a control channel based on self-interference and inter-user interference can be prevented from occurring.

In accordance with the scheme proposed by the present invention, it is assumed that the cell supporting the UE-specific TDD is used as a non-stand alone cell (or a non-stand alone carrier) and the corresponding cell is operated as a carrier aggregation (CA), CA can be classified into inter-band CA and intra-band CA. In order to configure the cell for supporting the UE-specific TDD mode in the corresponding UE, a base station (BS) can transmit concept of Table 1 to the corresponding UE through RRC (Radio Resource Control) signaling. The following Table 6 shows detailed content needed when configuration concept of the cell supporting the UE-specific TDD mode is signaled from the BS to the corresponding UE through an RRC connection reconfiguration (RRCConnectionReconfiguration) message in the legacy 3GPP TS 36.331 standard.

TABLE 6

| | |
|---|---|
| SCellToAddMod ::= | SEQUENCE { |
| sCellIndex | SCellIndex, |
| cellIdentification | SEQUENCE { |
| physCellId | PhysCellId, |
| dl-CarrierFreq | ARFCN-ValueEUTRA |
| UEFlexibleConfig | UEFlexibleTDD-Config |
| } | OPTIONAL, -- Cond |
| SCellAdd | |
| radioResourceConfigCommonSCell | RadioResourceConfig-CommonSCell |
| OPTIONAL, -- Cond SCellAdd | |
| radioResourceConfigDedicatedSCell | RadioResourceConfig-DedicatedSCell |
| OPTIONAL, -- Cond SCellAdd2 | |
| [[ dl-CarrierFreq-v1090 | ARFCN-ValueEUTRA-v9e0 OPTIONAL |
| Cond EARFCN-max | |
| ]] | |

In Table 6, the UEFlexibleConfig parameter may be contained in ScellToAddMod parameter for cell addition. The corresponding UE may configure a cell (SCell) for supporting the UE-specific TDD mode for the corresponding UE on the basis of a UEFlexibleTDD-Config parameter of the UEFlexibleConfig parameter.

Alternatively, the UEFlexibleConfig parameter is not defined as described above, and the legacy radioResource-ConfigCommonSCell parameter can be used to reduce the signaling overhead. In this case, a procedure for a specific case of the corresponding UE is newly defined, so that indication information of the cell supporting the UE flexible TDD can be implicitly transmitted to the UE.

On the other hand, according to the legacy FDD technology, if the ul-CarrierFreq parameter indicating a UL frequency contained in the radioResourceConfigCommonSCell parameter of the above RRCConnectionReconfiguration message is not defined, UL frequency information is obtained through a UL DL frequency separation parameter defined in 3GPP TS 36.101. In contrast, if the ul-CarrierFreq parameter is defined, the corresponding UL carrier frequency is used as a carrier frequency (or a carrier intermediate frequency) of the UL cell. In case of TDD, the UE may not use the corresponding ul-CarrierFreq parameter and may perform UL transmission in the same frequency as 'dl-CarrierFreq'.

The proposed method may define the ul-CarrierFreq information, and also define the UE operation procedures needed when configuration information is identical to 'dl-CarrierFreq' contained in the radioResourceConfigCommonSCell parameter contained in the RadioResourceConfigCommon information element. In more detail, assuming that dl-CarrierFreq and ul-CarrierFreq received through higher layer signaling are equally established, the UE may recognize that the corresponding cell is a cell capable of supporting the UL flexible TDD.

If the UEFlexibleConfig parameter is enabled for the UE through the above two methods or if ul-CarrierFreq and dl-CarrierFreq are equally established through the above two methods, the UE may assume that a physical downlink control channel (PDCCH), a Physical Broadcast Channel (PBCH), a Physical Control Format Indicator Channel (PCFICH), a Physical Hybrid-ARQ Indicator Channel (PHICH), and a Physical Uplink Control Channel (PUCCH) are not transmitted in the corresponding cell, so that the UE can operate on the above assumption. For this purpose, the corresponding SCell assumes that the cross carrier scheduling is basically operated because PDCCH, PCFHICH, and PHICH are not transmitted, recognizes that a data starting point (or a starting OFDM symbol) of a PDSCH starts from a first OFDM symbol within one subframe, and then performs data decoding on the basis of the recognized result. In this case, the cross carrier scheduling may indicate that the BS schedules, for the UE, a PDSCH or the like of an SCell indicated by the SCell index of the carrier indicator contained in a DCI format of a PDCCH of a PCell.

In this case, if the UE-flexible TDD cell is configured as a CA through the intra-band, it is assumed that PSS, SSS, and PRACH for synchronization are not transmitted in the corresponding cell, and the UE can operate on this assumption. That is, DL synchronization and UL synchronization in the UE-flexible TDD cell may operate on the basis of PCell. Therefore, data transmission can be normally performed even in subframes having indexes #0 and #5 to which PSS and SSS are transmitted by a base station (BS).

However, in the case of the inter-band, the UE needs to obtain synchronization of the UE-flexible TDD cell. Therefore, in the case of the inter-band, the BS may transmit PSS (Primary Synchronization Signal) and SSS (Secondary Synchronization Signal) through the corresponding UE-flexible TDD cell, and the UE may operate on the assumption of PRACH (Physical Random Access Channel) transmission. If the UE transmits a PRACH, the UE may always transmit the PRACH using the prach-ConfigSCell parameter dedicatedly received through 'RadioResourceConfigCommonSCell'.

On the other hand, in case of a Sounding Reference Symbol (SRS), the SRS can be transmitted in both the inter-band case and the intra-band case. Although the SRS has an object to measure a UL channel using the BS, channel reciprocity is achieved in the UE-flexible TDD cell, so that a DL channel measured by the UE is similar to the UL channel. However, if a channel has a short time-variant characteristic, if a user desires to correctly measure a channel without quantization errors, or if it is necessary to control inter-user interference, SRS needs to be transmitted so as to measure a channel between UEs. SRS configuration information may be contained in the RadioResourceConfigCommonSCell parameter and the RadioResourceConfigDedicatedSCell parameter of the RadioResourceConfigCommon information element. However, the following two problems may occur during SRS transmission.

First, if the UE transmits the SRS, interference may cause interference to a neighbor. UE (or a contiguous UE). That is, SRS transmitted by the neighbor UE may generate interference, so that reception (Rx) performance of PDSCH of a victim UE is deteriorated. Second, when the BS receives the SRS from the UEs, self-interference may occur in the BS due to a PDSCH transmitted at the same time. Therefore, due to the occurrence of self-interference, Rx performance of the SRS transmitted from UEs may be deteriorated.

For SRS transmission, SRS bandwidth and SRS subframe are cell-specifically configured through SoundingRS-UL-ConfigCommon parameter, UE obtains frequency position and sequence configuration information within cell-specific SRS bandwidth and cell-specific SRS subframe using 'SoundingRS-UL-ConfigDedicated' parameter, the frequency position and sequence configuration information discriminate UE-specific SRS bandwidth and UE-specific SRS subframe, UE acquires UE-specific SRS bandwidth and UE-specific SRS subframe using the frequency position and sequence configuration information (Here, the subframe offset is present in 'SoundingRS-UL-ConfigDedicated' parameter, so that the corresponding information can also be transmitted in other subframe(s) other than a cell-specifically defined subframe.)

In order to address the above-mentioned problems, the UE may not transmit a PDSCH at the last OFDM symbol of a subframe defined in 'SoundingRS-UL-ConfigCommon'. That is, a subframe, in which SRS will be transmitted through a configuration period ($T_{SFC}$) and a transmission offset ($\Delta_{SFC}$) obtained through 'srs-SubframeConfig' contained in 'SoundingRS-UL-ConfigCommon', is denoted by $\lfloor n_s/2 \rfloor$ mod $T_{SFC} \in \Delta_{SFC}$ and the last OFDM symbol of a PDSCH is not transmitted in the corresponding subframe. As a result, the UE can cancel Rx performance deterioration of a PDSCH and can estimate an inter-user interference channel, and the BS may correctly estimate the UL channel using the SRS transmitted from UEs. Resource block mismatch generated when the BS does not transmit the corresponding PDSCH may be solved through rate matching in the corresponding subframe.

As described above, according to the embodiments of the present invention, the cell for the user equipment (UE) specific flexible Time Division Duplex (TDD) mode is configured for the UE, and the UE can efficiently operate in the UE specific flexible TDD mode. If the UE operates in the UE specific flexible TDD mode, the BS does not transmit the last symbol of a PDSCH in the corresponding subframe in which SRS should be transmitted, so that self-interference of the BS can be removed and PDSCH Rx performance deterioration of neighbor UEs can be solved.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

As is apparent from the above description, exemplary embodiments of the present invention can provide a method for allowing a UE to perform UE-flexible TDD mode communication in a network configured to support the UE-flexible TDD mode in which BS can operate in a full duplex mode and the UE can operate in a half duplex mode, and the embodiments can also be applied to wireless communication systems such as 3GPP LTE/LTE-A for industrial purposes.

The invention claimed is:

1. A method for performing communication by a user equipment (UE) in a UE-flexible Time Division Duplex (TDD) mode in a network configured to support the UE-flexible TDD mode in which a base station (BS) operates in a full duplex mode and the UE operates in a half duplex mode, the method comprising:
receiving information related to a UE-flexible TDD mode support cell configured to support the UE-flexible TDD mode through a primary cell (PCell) from the BS;
receiving a physical downlink shared channel (PDSCH) from the BS through the UE-flexible TDD mode support cell based on the information;
if the UE-flexible TDD mode support cell is configured as an inter-band with the PCell or a secondary cell (SCell), receiving a Primary Synchronization Signal (PSS) or a Secondary Synchronization Signal (SSS) from the BS through the UE-flexible TDD mode support cell; and
transmitting a physical random access channel (PRACH) to the BS through the UE-flexible TDD mode support cell.

2. The method according to claim 1, further comprising:
if the UE-flexible TDD mode support cell is configured as an intra-band with the PCell or the SCell, receiving data from the BS through the UE-flexible TDD mode support cell within a subframe on which the BS transmits the PSS or the SSS.

3. The method according to claim 1, further comprising:
decoding symbols starting from a first symbol of a corresponding subframe of the UE-flexible TDD mode support cell to receive the PDSCH.

4. The method according to claim 1, wherein the information related to the UE-flexible TDD mode support cell is received through a radio resource control (RRC) connection reconfiguration message.

5. The method according to claim 1, wherein the information related to the UE-flexible TDD mode support cell is received through a Radio Resource Configuration Common information element (IE).

6. A user equipment (UE) for performing communication in a UE-flexible Time Division Duplex (TDD) mode in a network configured to support the UE-flexible TDD mode in which a base station (BS) operates in a full duplex mode and the UE operates in a half duplex mode, the UE comprising:
a receiver;
a transmitter; and
a processor configured to:
control the receiver to receive information related to a UE-flexible TDD mode support cell that supports the UE-flexible TDD mode through a primary cell (PCell) from the BS;
control the receiver to receive a physical downlink shared channel (PDSCH) from the BS through the UE-flexible TDD mode support cell based on the information;
if the UE-flexible TDD mode support cell is configured as an inter-band with the PCell or a secondary cell (SCell), control the receiver to receive a Primary Synchronization Signal (PSS) or a Secondary Synchronization Signal (SSS) from the BS through the UE-flexible TDD mode support cell; and
control the transmitter to transmit a physical random access channel (PRACH) to the BS through the UE-flexible TDD mode support cell.

7. The UE according to claim 6, wherein:
if the UE-flexible TDD mode support cell is configured as an intra-band with the PCell or SCell, the receiver further receives data from the BS through the UE-flexible TDD mode support cell within a subframe on which the BS transmits the PSS or the SSS.

8. The UE according to claim 6, wherein the processor is further configured to decode symbols starting from a first symbol of a corresponding subframe of the UE-flexible TDD mode support cell so as to receive the PDSCH.

9. The UE according to claim 6, wherein the information related to the UE-flexible TDD mode support cell is received through a radio resource control (RRC) connection reconfiguration message.

10. The UE according to claim 6, wherein the information associated with the UE-flexible TDD mode support cell is received through a Radio Resource Configuration Common information element (IE).

* * * * *